E. B. STEWART.
PORTABLE OVEN AND HEATING DRUM.
APPLICATION FILED MAR. 1, 1918.

WITNESSES
W. C. Fielding
S. M. McCall

INVENTOR
Elmer B. Stewart
BY
ATTORNEY

UNITED STATES PATENT OFFICE.

ELMER B. STEWART, OF BROOKLYN, NEW YORK.

PORTABLE OVEN AND HEATING-DRUM.

1,295,233.   Specification of Letters Patent.   Patented Feb. 25, 1919.

Application filed March 1, 1918. Serial No. 219,926.

*To all whom it may concern:*

Be it known that I, ELMER B. STEWART, a citizen of the United States, residing at Brooklyn, in the county of Kings and State of New York, have invented certain new and useful Improvements in Portable Ovens and Heating-Drums, of which the following is a specification.

This invention relates to heating and cooking apparatus and more particularly to portable devices of this character.

The object of the invention is to provide a simply constructed portable oven and heating drum which may be used either in connection with a stove or not, as desired.

Another object is to provide a device of this character so constructed as to present a maximum heat radiating surface and at the same time an ornamental appearance and which is formed to provide a cooking chamber or oven and a warming oven.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
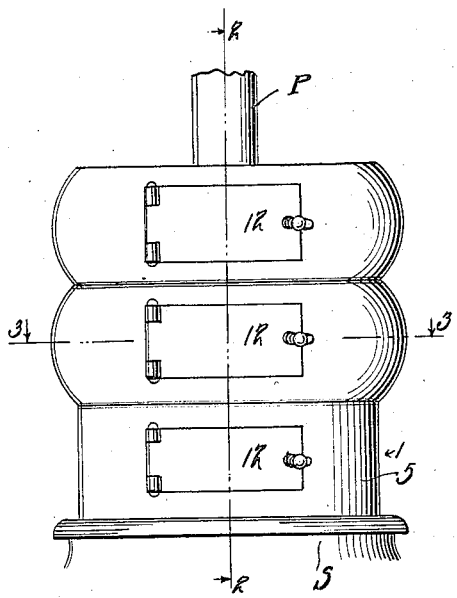
Figure 2:
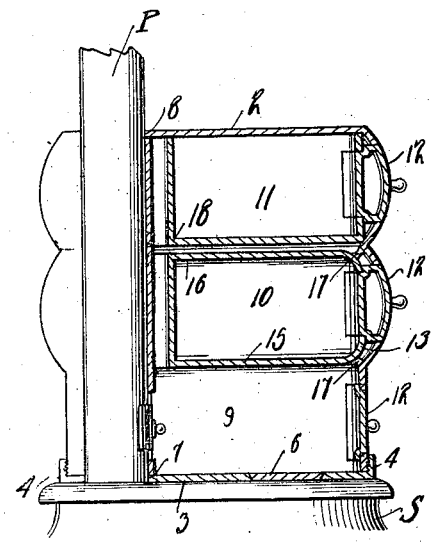
Figure 3:
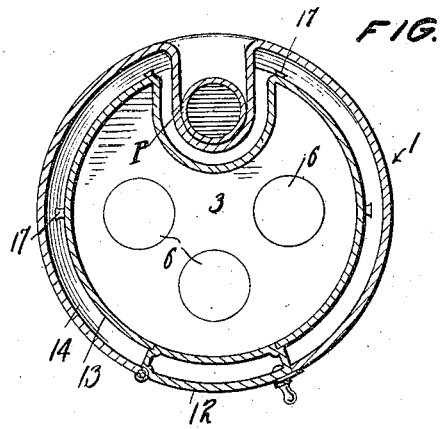
Figure 4:
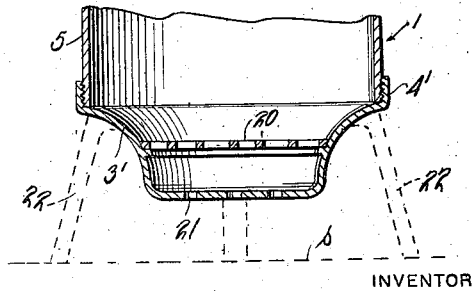

Figure 1 represents a front elevation of one form of the invention shown applied to a heating stove the smoke pipe thereof being broken off, Fig. 2 is a vertical sectional view thereof shown applied and taken on the line 2—2 of Fig. 1, Fig. 3 is a horizontal section taken on the line 3—3 of Fig. 1, and Fig. 4 is a vertical detail sectional view of the lower portion of a heating apparatus of this character showing a slightly different form thereof.

In the embodiment illustrated in Figs. 1 to 3, the combined portable oven and heating drum constituting the invention comprises an outer casing 1 having a closed top 2 which may be made integral therewith or not, as found desirable, and a removable bottom 3. This bottom 3 as shown has an upstanding annular peripheral flange 4 internally threaded to engage the threaded exterior of the lower end 5 of the casing as is shown clearly in Fig. 2 and which provides for the removal and attachment of said bottom when desired. This bottom 3 is provided with a plurality of openings closed by removable lids 6 such as are ordinarily used on cooking stoves. This bottom also has an opening 7 therein which is designed to fit around and closely surround the smoke pipe P of the stove S, to which this oven is shown applied. The top 2 is also provided with an opening 8 which registers with the opening 7 in the bottom of the drum and through which the pipe P passes.

This casing 1 is divided into three compartments or chambers 9, 10 and 11, arranged one over the other and each provided with a door 12 to afford access to the interior thereof. The lower chamber 9 as shown is provided with rectilinear walls, but obviously these walls may be bulged in the manner similar to the other chambers if found desirable. The intermediate chamber 10 has bulged side walls to present a maximum heat radiating surface and also to provide a hot air conduit between the inner face thereof and the lining 13 of said compartment. This lining 13 is of a height substantially equal to the height of the bulged side walls of chamber 10 and is made rectilinear to form a hot air space 14 between said lining and the inner wall of casing 1, the products of combustion or the heat radiated from the stove S passing between said lining and casing. This chamber 10 has a bottom 15 and a top 16 which are preferably made integral with the side walls 13 thereof as shown in Fig. 2. The lining of this chamber is spaced from the casing 1 by lugs 17, two sets of which are provided, one at the top and one at the bottom of the chamber. These spacing lugs 17 may be made integral with the lining or not, as found desirable and operate to space it a sufficient distance from the casing to permit the free passage of heated air between the lining and the casing.

The upper chamber 11 which is designed to form a warming oven, has a bottom 18 spaced above the top 16 of the intermediate chamber or oven 10 a sufficient distance to permit the passage of hot air between them and the side walls 19 of this oven 11 are also made rectilinear and spaced from the bulged side walls of the casing 1 to form a heated air retaining space.

From the above description it will be obvious that the side walls of the intermediate chamber 10, which is designed as a cooking oven, and those of the warming oven 11 are bulged outwardly, thereby providing a maximum heat radiating surface and at the same time forming heat passages between the inner faces of said bulged portions and the linings of the compartments 10 and 11.

It will thus be seen that this combined portable oven and heating drum may be placed on the stove S by passing it around the smoke pipe P and when it is so placed the top lid of the stove is preferably removed to permit the products of combustion to pass up into the chamber 9 and through the conduits around the ovens 10 and 11, sufficient heat being provided to enable oven 10 to be used as a baking oven while oven 11 disposed above it, may be used as a warming oven.

When it is desired to convert this device into a camping stove or to use it without applying it to an ordinary heating stove, the bottom 3 shown in Figs. 1 to 3 is removed and bottom 3' shown in Fig. 4 substituted. This bottom 3' has an upstanding interiorly threaded flange 4' similar to the flange 4 of the bottom 3 shown in the other figures and which is designed to removably engage the lower end 5 of the heating drum. This bottom is made of a depth sufficient to form a fire box and has a grate 20 on which the wood or coal to be used is designed to be placed. Below the grate the bottom has a plurality of openings 21 through which the ashes are designed to pass. This bottom is also provided with supporting legs shown in dotted lines at 22 so that it will be held a proper distance above its supporting surface indicated at s.

From the above description it will be seen that this portable heater and cooking drum may be readily transported from place to place and applied to a stove with very little trouble, or used as a camping stove in the manner above described, two bottoms being supplied with each drum to adapt it to be changed for the purpose above set forth.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

A portable oven comprising a closed casing having a closed top and a removable bottom, a plurality of vertically arranged superposed chambers in said casing, some of said chambers having bulged outer side walls and rectilinear inner side walls to form a heat chamber between them with combined braces and spacers connecting their corners, the top and bottom of two adjacent chambers being spaced and said space communicating with the chamber between the bulging and rectilinear side walls, said casing and the side walls of said chambers being recessed to receive a smoke pipe of a stove in connection with which the oven is to be used.

In testimony whereof I affix my signature in presence of two witnesses.

ELMER B. STEWART.

Witnesses:
WILLIAM S. FOWLER,
JOHN E. BURCH.

Copies of this patent may be obtained for five cents each, by addressing the "Commissioner of Patents, Washington, D. C."